No. 641,767. Patented Jan. 23, 1900.
H. DRÖSSE.
METHOD OF ELECTRIC ARC HEATING AND APPARATUS THEREFOR.
(Application filed Dec. 13, 1898.)
(No Model.)
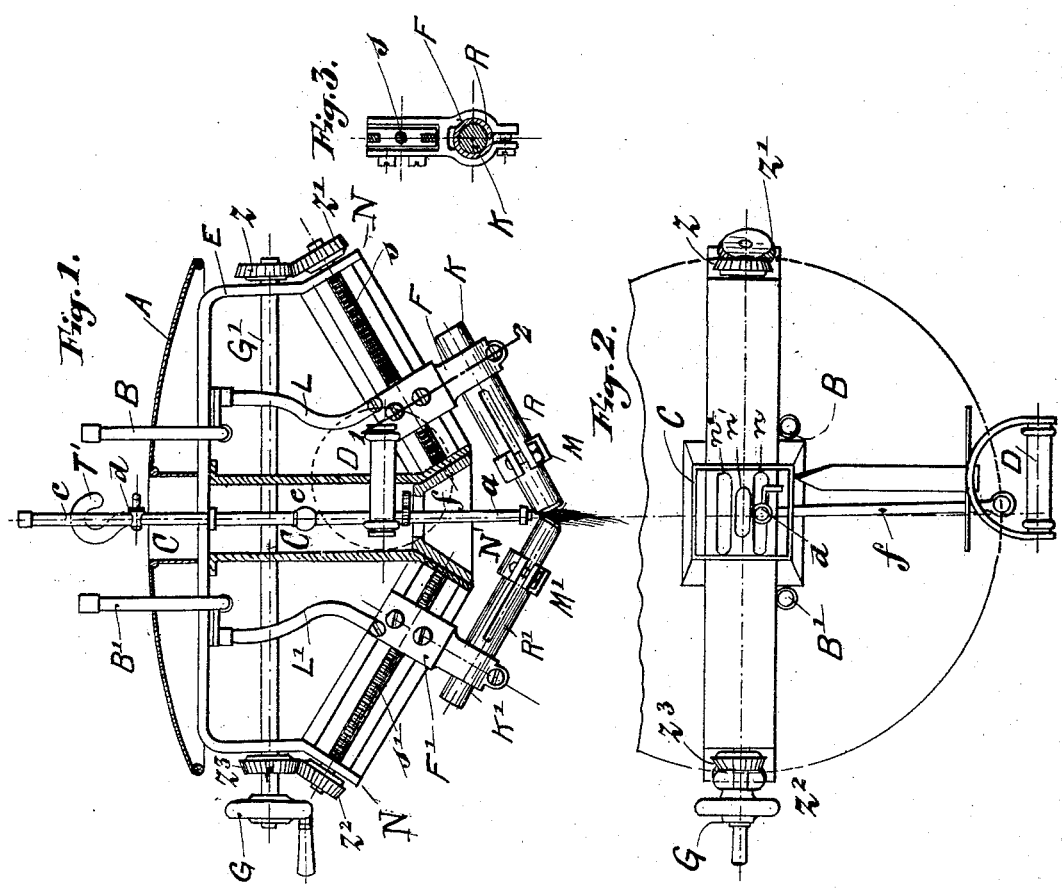

UNITED STATES PATENT OFFICE.

HERMANN DROSSE, OF BERLIN, GERMANY.

METHOD OF ELECTRIC-ARC HEATING AND APPARATUS THEREFOR.

SPECIFICATION forming part of Letters Patent No. 641,767, dated January 23, 1900.

Application filed December 13, 1898. Serial No. 699,178. (No model.)

*To all whom it may concern:*

Be it known that I, HERMANN DROSSE, a citizen of the Empire of Germany, residing at Berlin, Germany, have invented certain new and useful Improvements in Methods of and Devices for Applying a Jet of Air or Gas to an Electric Arc, of which the following is a specification.

Irregularity in the consumption of electric-light carbons naturally causes irregularity in the arc between them. It becomes important to compensate for this irregular action and to remedy the resulting defect. This I accomplish by applying a blast of air or other gas to the arc by means which permit the direction of the blast to be varied at will as becomes necessary for the purpose stated. The said blast is also used to thin and spread the flame of the arc, and its force may be regulated to increase or decrease its action on the latter.

One feature of the new process carried into practice by means of the improved device consists in employing reducing-gas for blowing to do away with the high oxidizing action of the arc, which action is often very objectionable for welding or soldering purposes, and the blast-gas may be atmospheric air combined with burnable and unburnable gas, such as lighting-gas, hydrogen, acetylene, and certain hydrocarbons, which by the high degree of heat of the electric arc are decomposed into their components, carbon and hydrogen, so as to have a high reducing action.
In the same way liquids containing carbon or hydrogen—such as petroleum, benzin, and ligroin—are immediately reduced into gas and decomposed by the flame.

The invention consists in the features of construction and combination of parts hereinafter fully described and claimed.

In the accompanying drawings, Figure 1 is a side elevation of the improved apparatus. Fig. 2 is a top plan view of same, the cover A, which is optional, being omitted; and Fig. 3 is a sectional detail view on line 1 2 of Fig. 1.

In the drawings like letters refer to like parts throughout all the figures.

In the frame E of the mechanism a shaft G' is journaled, said shaft being actuated by hand-wheel G and carrying outside of the depending parts of said frame two bevel gear-wheels $z$ and $z^3$, meshing with gear-wheels $z'$ and $z^3$, respectively. These latter gear-wheels are mounted on threaded feed-shafts $s$ and $s'$, respectively, the said shafts being journaled near their outer ends in bearings N, forming part of frame E, and at their inner ends in bearings N', integral with the lower end of outlet-flue C, for the products of combustion. This flue is rigidly attached to frame E and is wider than the latter to allow upward draft. The feed-shafts $s$ and $s'$ are engaged by suitable feed-nuts F and F', carrying the carbon-holders and constructed as shown in Fig. 3 of the drawings. The feed-nuts are insulated from said feed-shafts. The carbons or electrodes K K' are inserted into longitudinally-slit tubes R or R' and secured therein by clamps M M', said tubes R R' being held in clamps provided on nuts F and F'. This arrangement of the electrodes prevents the same from being quickly consumed during the welding process, said arrangement providing a larger surface to the passage of the current and leading the latter near the points of the carbons. The air and gas are led to the electric arc produced between the ends of the carbons K and K' through blast-pipe $c$, terminating in a nozzle $a$, pivotally attached to said pipe at $e$ and secured to a handle-rod $f$, horizontally extending therefrom and serving to give the nozzle $a$ any required position for deviating the flame in any direction. The blast-pipe $c$ has at its upper part a cock $d$ for controlling the pressure of the fluid (gas or liquid) to obtain a more or less greater deviation of the flame.

The current passes through the apparatus as follows: from feed-wire B through the flexible cable L to carbon-holder F and after production of the arc to negative carbon-holder F' through cable L' and return-wire B'.

The top part of the frame E may be provided with a hook or its equivalent T for suspending the apparatus to a movable carriage, and the apparatus may have a suitable handle D located near handle $f$ and serving to move the apparatus as required. Furthermore, a cover A may be provided on top of the frame, as shown in Fig. 1, having a central passage which forms an upward extension of flue C, making a continuous flue or passage. The central part of frame E is slotted at $n$, $n'$, and $n^2$ within the said flue to allow the passage of the blast-tube $c$ and the attachment of the suspending-hook T' as well as to facilitate the escape of the products of combustion, and other modifications may be made in the construction and arrangement of the various parts without departing from the scope of the invention.

Having fully described my invention, what I claim, and desire to secure by Letters Patent, is—

1. In combination with the electric conductors and carbons forming an electric arc, adjusting mechanism for the said carbons, a blast-tube for discharging air or gas against the arc, and adjusting devices for varying at will the direction of the said tube and the blast issuing therefrom, the said tube-adjusting devices being independent of the carbon-adjusting devices, in order that the blast may be applied to the arc at different inclinations, substantially as set forth.

2. In an apparatus of the character described the combination with a suitable frame, of suitable means for holding the electrodes and suitable movement-transmission devices for controlling said electrodes in accordance with the consumption, a chimney arranged at the center of the apparatus and connecting the parts of the frame, a blast-pipe extending through said chimney and having a movable nozzle to permit the deviation of the electric arc in any required direction, substantially as set forth.

3. The method or process of assisting the action of the electric arc on metals and other materials consisting in directing a flow of liquid hydrocarbons or other liquid-reducing agents against and into the electric arc, substantially as set forth.

In witness whereof I have hereunto signed my name, this 29th day of November, 1898, in the presence of two witnesses.

HERMANN DRÖSSE.

Witnesses:
ERWIN L. GOLDSCHMIDT.
HENRY HASPER.